Aug. 8, 1944.   G. W. CARLSON   2,355,053
OPHTHALMIC MOUNTING
Filed April 22, 1940
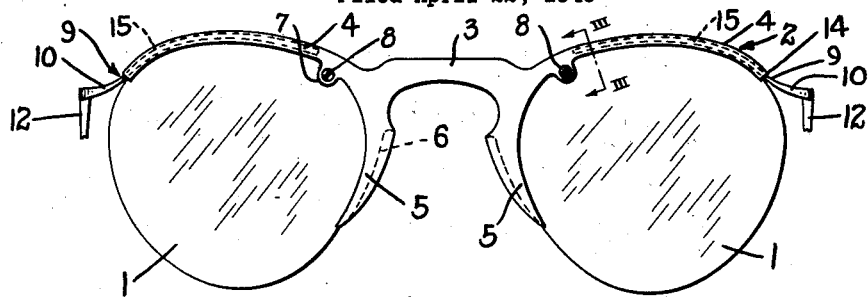
Fig. I
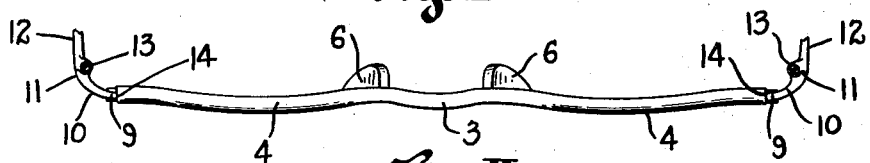
Fig. II
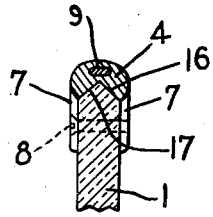
Fig. III
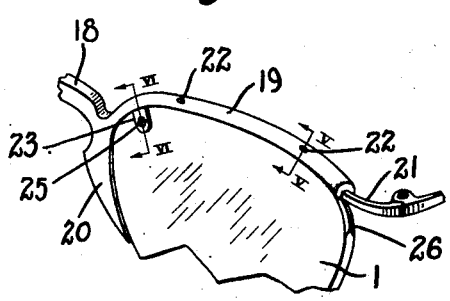
Fig. IV
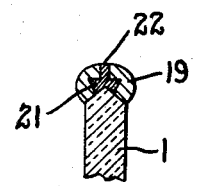
Fig. V
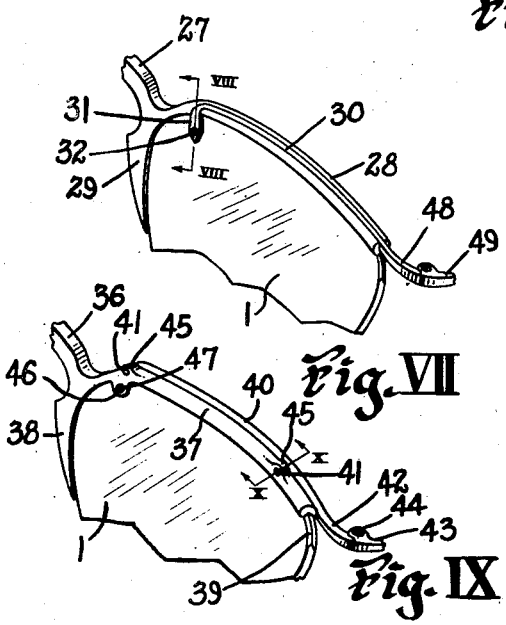
Fig. VII
Fig. IX
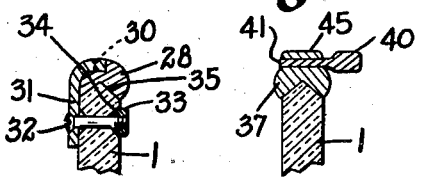
Fig. VIII   Fig. X
INVENTOR.
GEORGE WILLARD CARLSON
BY Harry H. Styll
ATTORNEY.

Patented Aug. 8, 1944

2,355,053

UNITED STATES PATENT OFFICE 2,355,053

OPHTHALMIC MOUNTING

George Willard Carlson, Minneapolis, Minn., assignor to American Optical Company, Southbridge, Mass., a voluntary association of Massachusetts Application April 22, 1940, Serial No. 330,917

8 Claims. (Cl. 88—41)

This invention relates to ophthalmic mountings and has particular reference to an improved supporting structure for the lenses of such mountings.

One of the principal objects of the invention is to provide an ophthalmic mounting of the type having its lens supporting structure arranged so that the major portions thereof lie above the useful field of vision when the mounting is in position of use on the face, particularly throughout the sides of the lenses, with the said supporting structure so formed as to have the strength and durability inherent to a supporting structure formed of metal and yet possess the non-corrosive acid resistance and comfort inherent in mountings formed of non-metallic materials.

Another object is to provide an ophthalmic mounting having a semi-frame type lens supporting structure of non-metallic material with portions thereof reinforced by metal whereby the said parts may be adjusted and will retain said adjustments.

Another object is to provide a combined non-metallic and metallic lens supporting structure in which the metal parts are relatively inconspicuous and substantially concealed from view when the mounting is in position of use.

Another object is to provide a combined non-metallic and metallic lens supporting structure whereby the non-metallic material functions as cushioning means for spacing the lenses from the metallic supporting parts.

Another object is to provide a non-metallic lens supporting structure whereby the bridge, nose bearing pads and parts fitting about a portion of the contour edges of the lenses are formed of non-metallic material and afford attachment means for other parts of the mounting formed of metal.

Another object is to provide a supporting structure for the lenses of an ophthalmic mounting with bridge portions formed to different graded sizes and with the remaining portions thereof arranged so as to be adjustable to different configurations and to substantially retain said adjustments.

Other objects and advantages of the invention will become apparent from the following description taken in connection with the accompanying drawing and it will be apparent that many changes may be made in the details of construction and arrangement of parts shown and described without departing from the spirit of the invention as expressed in the accompanying claims. I, therefore, do not wish to be limited to the exact details of construction and arrangement of parts shown and described as the preferred forms only have been given by way of illustration.

Referring to the drawing:

Fig. I is a front elevation of an ophthalmic mounting embodying the invention;

Fig. II is a plan view of the mounting illustrated in Fig. I;

Fig. III is a fragmentary enlarged sectional view taken as on line III—III of Fig. I and looking in the direction indicated by the arrows;

Fig. IV is a fragmentary perspective view of a modified form of the invention;

Fig. V is a fragmentary enlarged sectional view taken as on line V—V of Fig. IV and looking in the direction indicated by the arrows;

Fig. VI is a fragmentary sectional view taken as on line VI—VI of Fig. IV and looking in the direction indicated by the arrows;

Fig. VII is a view generally similar to Fig. IV showing a further modification;

Fig. VIII is an enlarged fragmentary sectional view taken as on line VIII—VIII of Fig. VII and looking in the direction indicated by the arrows;

Fig. IX is a view generally similar to Fig. IV of a still further modification and Fig. X is an enlarged fragmentary sectional view taken as on line X—X of Fig. IX.

Referring more particularly to the drawing wherein like characters of reference designate like parts throughout the several views the device embodying the invention, as illustrated in Fig. I, comprises broadly a pair of lenses 1 carried by a supporting structure 2. The supporting structure 2 comprises a main bridge member 3 having integral portions 4 and 5 shaped substantially to follow the adjacent contour edge portions of the lenses 1. The portions 5 are provided with rearwardly extending integrally formed nose bearing pads 6 which are adapted to engage the sides of the nose to aid in supporting the mounting on the face of the wearer. The portions 4 are adapted to follow substantially the upper contour edges of the lenses, as illustrated in Fig. I, and are secured to said lenses through the provision of a suitable tongue or tongues 7 shaped to overlie the side surface or surfaces of the lenses 1 and connected thereto by a screw or other suitable connecting means 8 which extends through aligned openings formed in the tongue or tongues 7 and the lens 1. This connection is of the usual conventional type except that in this particular instance the tongues 7 are preferably formed integral with the portions 4. The portions 3, 4 and 5, as well as the integral nose bearing pads 6 and tongues 7, are preferably formed of non-metallic material, such as Celluloid, Bakelite, methyl methacrylate, or other artificial resin or resinous material. It is to be understood that the said portions may be formed of any of the known plastic materials. The said portions, however, are preferably formed of materials having the characteristics of artificial resins which possess a relatively non-inflammable, acid resisting nature and which tend to retain the shape to which they are formed. Such materials are also exceedingly light in weight and are readily moldable or otherwise workable. The said portions 3, 4 and 5 may be formed to any desired color or colors.

The portions 4, as illustrated in Figs. I, II and III, are preferably reinforced with bar-like members 9 formed of materials having adjustable characteristics. It is to be understood, however, that the said bar-like members 9 may be formed pliable, ductile or resilient or may possess one or more of said characteristics. The bar-like members 9, as illustrated in Figs. I and II, terminate in adjustable temple supporting portions 10 which are provided with an end 11 to which suitable temples or sides 12 are pivotally attached as illustrated at 13. The portions 10 extend outwardly of the adjacent end 14 of the portions 4 which terminate at a location normally above the useful field of side vision when the mounting is in position of use on the face. The said temple supports 10 and temples 12 are also located adjacent this position. The bar-like members 9 extend inwardly of the body of the portions 4 and extend longitudinally thereof a substantial distance, as illustrated by the dotted lines 15, in Fig. I. The bar-like members 9 preferably extend substantially throughout the length of the portions 4 so as to afford means for retaining the said portions 4 in adjusted position. The said adjustments being such as to cause the said portions 4 to follow substantially the shape of the upper contour edges of the lenses.

By reference to Fig. III it is to be noted that the portions 4 and 5 are provided throughout the length thereof with an internal V-shaped groove 16 adapted to receive the upper bevelled edge 17 of the lens. It is to be understood that although the lenses throughout the edge thereof engaged by the portions 4 and 5 are preferably bevelled and the said portions 4 and 5 are provided with a V-shaped groove to receive said bevel the said contour edges, however, may be formed to any particular shape desired with the portions 4 and 5 similarly shaped to interfit therewith. The bridge portions 3, such as shown in Fig. I, including the nose bearing pads 6 are preferably made to graded sizes so as to provide mountings which will fit the nasal requirements of different individuals. The portions 4, however, may or may not be formed to different lengths as desired. They may be preformed to the length desired or the ends 14 thereof may be cut off to the length desired. The said portions 4 and the bar-like members 9 may be altered in shape by bending and will retain the shapes to which they are adjusted. The main central arch portions of the bridge members 3, as shown in the drawing, are not readily adjustable but the distance between the nose bearing pads 6 or the inset or outset of the bridge may be altered by heating the central arch portion and increasing or decreasing the forward cupping thereof. It is apparent, however, that if desired the said bar-like members 9 may be extended entirely through the main central arch portion 3 of the bridge in which instance the said bar-like members would tend to permit greater ease in adjustment and would tend to retain said adjustment.

In the construction illustrated in Figs. I to III the non-metallic material of the portions 4 provides cushioning means between the metallic bar-like members 9 and the contour edges of the lenses. The said portions 4 also function as non-corrosive coverings for the bar-like members 9 so as to protect them from engagement with the flesh of the face adjacent the eyes and to protect them from perspiration and corrosion. The portions 10 may be adjusted independently of the portions of the bar-like members 9 which are covered by the non-metallic material of the portions 4.

In Fig. IV there is illustrated a modification which comprises portions 18, 19 and 20 simulating the portions 3, 4 and 5 described above. In this instance, the portions 19 and 20 are provided with an internal longitudinally extending groove with which a bar-like member 21 simulating the bar 9 has a dove tail connection, as illustrated in Fig. V. Suitable pins or other desirable connecting means 22 may be employed for aiding in securing the bar-like member 21 and portion 19 together. In this instance, the bar-like member 21 is provided with integral portions 23 and 24 shaped to overlie the opposed side surfaces of the lens 1 and to be connected thereto by a screw, pin or other suitable connecting means 25 which extend through aligned openings in said portions 23 and 24 and in the lens. In this instance, the lens is provided with an upper bevelled edge 26. The said portions 23 and 24 provide a lens strap connection for securing the general supporting structure to the lenses. It is to be understood that, in the above constructions illustrated in Figs. I to VI, if desirable, the said bar-like members 9 or 21 as the case may be might be adjusted longitudinally of the portions 4 and 19 so as to accommodate for use of lenses of different sizes and that suitable means might be provided, in the form of an adhesive in which the bar-like members might be dipped prior to placing them in telescopic relation with the portions 4 or 19, as the case may be, for securing the parts together after adjustment. It is to be understood, in this particular instance, that connecting means such as the pin like members 22 or other similar means would not be employed. As shown in Fig. V, the bar-like member 21 is provided with a V-shaped groove and the inner adjacent walls of the portion 19 are bevelled so as to lie substantially flush with the walls of the V-shaped groove of the member 21.

In Fig. VII there is illustrated a further modification embodying portions 27, 28 and 29 simulating the portions 3, 4 and 5. The portion 28, in this instance, is provided with a longitudinal groove in the upper surface thereof in which is fitted an adjustable reinforcing bar-like member 30 simulating the bar-like member 21. The bar-like member 30, like the bar 21, is provided with a suitable lens holding means 31 secured to the lens by connecting means 32, such as a screw or other desirable connecting means, such as shown in Fig. VIII. The lens holding means 31 is provided only with one portion adapted to overlie a side surface of the lens. The connection means 32, in this particular instance, is shown to be a bolt-like member having a nut 33. In this instance, the nut is provided with a bevelled surface 34 on the inner face thereof adapted to engage in the bevelled counter bore in the attachment opening in the lens. It is to be understood, however, that the said nut may be provided with a lip adapted to overlie the adjacent side surface of the lens and bear on said surface when tightened, if desired, so as to relieve strain at the connection. The members 28 and the lenses are provided with interfitting surfaces 35 in the form of V-shaped bevels or other desirable means. The portion 31 fits within a recess formed in the side of the member 28 and the outer surface thereof as well as the outer surface of the bar-like member 30 lies substantially flush with the adjacent outer surface of the bar-like member 28. The bar-like member 30 is concealed by the member 28 when the mounting is viewed from the front. In Figs. IX and X there is illustrated a further modification which comprises portions 36, 37 and 38 simulating the portions 3, 4 and 5. In this instance the member 37 which is formed of non-metallic material like the members 3, 4 and 5 is provided with an inner bevelled surface shaped to fit the adjacent bevelled edge 39 of the lens. The bar-like member 40 simulating the bar-like members 9, 21 and 30 in this instance lies in the rear of the portion 37 which is shaped to follow the upper contour shape of the lens 1 and is provided with connecting means 41 which may be in the form of pins, screws or other means for securing the bar-like member 40 to the member 37. The bar-like member 40 is provided with an adjustable end 42 to which a suitable temple 43 is pivotally attached, as illustrated at 44. The connecting means 41, as illustrated in Figs. IX and X, extend through suitable built up portions 45 on the member 37. Said member 37 is provided with lips 46 shaped to overlie the side surfaces of the lens and which are connected to the lens by suitable connecting means 47. Referring again to Figs. VII and VIII the bar-like member 30 is provided with an adjustable end 48 to which a suitable temple 49 is pivotally attached. This end may be adjusted independently of the member 28. The adjustment of the ends of the bar-like members is to increase or decrease the distance between the temples, to raise or lower the temples or to change the angle thereof relative to the plane of the lenses.

Although the various constructions have been described as having a bridge member simulating the bridge member 3 formed to given sizes and having portions 4 and 5 formed integral therewith the invention, as far as the combined metallic and non-metallic portions which are shaped to follow substantially the upper contour shape of the lenses are concerned, might be used with different types of bridge members and it is also to be understood that the nose bearing pads 6 instead of being formed integral with the bridge might be constructed with adjustable supporting arms with separate pads loosely connected to said arms as is known in the art.

Having described my invention, I claim:

1. A unitary lens-supporting structure for the lens of an ophthalmic mounting comprising a bridge member of non-metallic material having integral portions extending therefrom, one of said portions being shaped to follow substantially only the upper contour edge of the lens and the other of said portions being shaped to follow substantially only the nasal portion contour edge of the lens adjacent the bridge member, said portion following the upper contour edge of the lens extending substantially throughout the length of the upper contour edge of the lens and having a reinforcing member of bar-like metallic material extending substantially longitudinally thereof and in secured relation therewith and having a relatively long adjustable temple supporting end extending outwardly and rearwardly from the free end thereof.

2. An ophthalmic mounting comprising a unitary lens-supporting structure for the lens of an ophthalmic mounting comprising a bridge member of non-metallic material having integral portions extending therefrom, one of said portions being shaped to follow substantially only the upper contour edge of the lens and the other of said portions being shaped to follow substantially only the nasal portion contour edge of the lens adjacent the bridge member, said portion following the upper contour edge of the lens extending substantially throughout the length of the upper contour edge of the lens and having a reinforcing member of bar-like metallic material extending substantially longitudinally thereof and in secured relation therewith and having a relatively long adjustable temple supporting end extending outwardly and rearwardly from the free end thereof adjacent the temporal edge of the lens, and a temple pivotally connected to said temple-supporting end.

3. A lens supporting structure for the lenses of an ophthalmic mounting, said lens supporting structure comprising a bridge member having non-metallic portions extending outwardly of the opposed sides thereof substantially throughout the length of the upper contour edges of the lenses when in position thereon, said non-metallic portions terminating adjacent the upper temporal edges of the lenses and each having a longitudinal recess therein, a relatively long and slender metallic member fitting within the respective recesses from adjacent the upper nasal edges of the lenses throughout the length of the non-metallic members and having an end extending outwardly and rearwardly of the temporal ends of said non-metallic members and terminating in a temple connection, said outwardly and rearwardly extending portions providing means adjustable independently of the non-metallic portions for varying the relative positions of the temples and means for securing the lens supporting structure to the lenses.

4. A lens supporting structure for the lenses of an ophthalmic mounting comprising a bridge member, relatively long and slender non-metallic portions extending outwardly of the opposed sides of the bridge member and shaped to follow substantially the upper contour edges of the lenses throughout the upper portions thereof when in position thereon, said relatively long and slender non-metallic members having a longitudinal slotted recess therein, relatively long and slender bar-like metallic members fitting within said slotted recesses from adjacent the nasal sides of the lenses and extending throughout the length of said non-metallic members and having portions extending outwardly and rearwardly of the temporal ends of said non-metallic portions and terminating in a temple connection, said portions extending outwardly and rearwardly of the temporal ends of said non-metallic portions providing sections adjustable independently of the non-metallic portions for varying the positional relation of the temples and means carried by said long and slender bar-like metallic members for connection with the lenses.

5. A lens supporting structure for the lenses of an ophthalmic mounting comprising a bridge member, long and slender non-metallic portions shaped substantially to follow the upper contour edges of the lenses, said non-metallic portions each having a longitudinal recess therein on the side thereof towards the lenses, relatively long and slender bar-like members fitting within said longitudinal recesses from adjacent the nasal sides of the lenses and extending throughout the length of said non-metallic portions and extending outwardly and rearwardly of the temporal ends of said non-metallic portions and terminating in temple connections, said outwardly and rearwardly extending portions of the bar-like members providing means for adjusting the positional relation of the temples independently of the non-metallic portions and means carried by said bar-like members for securing the supporting structure to the lenses, said bar-like members lying between the long and slender non-metallic portions and the adjacent upper edges of the lenses when the supporting structure is in connected relation with the lenses.

6. A lens supporting structure for supporting the lenses of an ophthalmic mounting, said lens supporting structure comprising a non-metallic bridge member having long and slender non-metallic portions shaped to follow substantially only the upper contour edges of the lenses and non-metallic parts extending below the bridge member shaped to follow the nasal contour edges of the lenses, said long and slender non-metallic portions extending substantially throughout the length of the upper contour edges of the lenses, means for connecting lenses to said non-metallic structure and metallic means connected with said long and slender non-metallic portions which are shaped to follow the upper contour edges of the lenses so as to reinforce said portions and to aid in retaining them in adjusted relation, said metallic means being substantially entirely concealed by said long and slender non-metallic portions when the mounting is viewed from the front and said metallic means having temple hinge connections extending outwardly of and spaced from the temporal ends of said relatively long and slender non-metallic portions.

7. A lens supporting structure comprising a non-metallic bridge member for supporting lenses in spaced relation having relatively long and slender non-metallic portions extending outwardly of the opposed sides thereof and shaped substantially to follow only the upper contour edges of the lenses substantially throughout the length of said upper contour edges of the lenses, said non-metallic bridge member and relatively slender non-metallic portions being in integral relation with each other and reinforcing strips of metallic material shaped to follow the upper contour edges of the lenses secured to said relatively slender non-metallic portions so as to reinforce the same and aid in retaining said slender non-metallic portions in adjusted and fitted relation with the lenses throughout the length of said slender non-metallic portions, said metallic strips having temple hinge connections extending outwardly of the temporal ends of said relatively long and slender non-metallic portions.

8. A lens supporting structure for the lenses of an ophthalmic mounting, said lens supporting structure comprising a bridge member having non-metallic portions extending outwardly of the opposed sides thereof and shaped to follow substantially the upper contour edges of the lenses throughout the upper portions thereof when in position thereon, said non-metallic portions terminating adjacent the temporal sides of the lenses, a relatively long and slender metallic member extending substantially throughout the length of each of the non-metallic portions, each of said long and slender metallic members having an end portion extending outwardly and rearwardly of the non-metallic portions adjacent the temporal sides of the lenses and having temple connection means thereon, said non-metallic portions and long and slender metallic members being connected with each other in such a manner that said non-metallic portions will be reinforced by said long and slender metallic members with the said non-metallic portions substantially entirely concealing the long and slender metallic members from view when the mounting is viewed from the front, and means for securing the lens supporting structure to the lenses.

GEORGE WILLARD CARLSON.